(12) United States Patent
Kim

(10) Patent No.: US 11,934,734 B2
(45) Date of Patent: Mar. 19, 2024

(54) DISPLAY APPARATUS OF VEHICLE AND METHOD FOR OPERATING THE SAME

(71) Applicant: HYUNDAI MOBIS CO., LTD., Seoul (KR)

(72) Inventor: Myeong Je Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/859,199

(22) Filed: Jul. 7, 2022

(65) Prior Publication Data

US 2023/0048182 A1    Feb. 16, 2023

(30) Foreign Application Priority Data

Aug. 10, 2021 (KR) .................. 10-2021-0105354

(51) Int. Cl.
*G06F 3/14* (2006.01)
*B60Q 1/00* (2006.01)
*B60Q 1/04* (2006.01)

(52) U.S. Cl.
CPC ......... *G06F 3/1423* (2013.01); *B60Q 1/0017* (2013.01); *B60Q 1/04* (2013.01)

(58) Field of Classification Search
CPC .......... G02B 27/0101; G02B 2027/014; G02B 2027/0141
See application file for complete search history.

(56) References Cited

U.S. PATENT DOCUMENTS

| | | | |
|---|---|---|---|
| 11,548,443 B2 * | 1/2023 | Oniwa | H04N 7/183 |
| 2020/0285846 A1 * | 9/2020 | Yamanaka | B60W 10/20 |
| 2020/0286450 A1 * | 9/2020 | Furuya | G06T 13/00 |
| 2021/0383125 A1 * | 12/2021 | Joo | G06V 20/46 |
| 2022/0019396 A1 * | 1/2022 | Choi | B60W 50/14 |
| 2022/0246999 A1 * | 8/2022 | Austin | B60L 53/18 |
| 2022/0350155 A1 * | 11/2022 | Nakabayashi | G02B 27/0179 |

* cited by examiner

*Primary Examiner* — Van N Chow
(74) *Attorney, Agent, or Firm* — NovoTechIP International PLLC

(57) ABSTRACT

A display apparatus of a vehicle includes a first display device to display an image including first information and second information related to the vehicle, to a first display region, a second display device to display the image to a second display region, a first controller to control an operation of the first display device, based on acquired information on a behavior of the vehicle, and a second controller to control an operation of the second display device, based on the acquired information on the behavior of the vehicle.

11 Claims, 10 Drawing Sheets

DISPLAY APPARATUS OF VEHICLE AND METHOD FOR OPERATING THE SAME

CROSS-REFERENCE TO RELATED APPLICATIONS

This application claims the benefit of priority to Korean Patent Application No. 10-2021-0105354, filed in the Korean Intellectual Property Office on Aug. 10, 2021, the entire content of which is incorporated herein by reference.

BACKGROUND

1. Technical Field

The present disclosure relates to a display apparatus of a vehicle, a method for operating the same, and a vehicle.

2. Discussion of Related Art

In general, a head lamp of a vehicle is used to ensure a stable front view at night or in a tunnel, a fog condition, or a rain condition, in which a surrounding environment is dark.

Recently, a higher resolution light emitting device (LED) has been used even in a head lamp of a vehicle, as the use of the higher resolution LED is enlarged. Accordingly, technologies and applications to project an image on a road surface using the head lamp of the vehicle have been developed.

The head lamp of the vehicle projects images on the road surface by using display apparatuses positioned at opposite sides of the vehicle. When the difference is made between the images projected from the opposite display apparatuses due to the vibration made during the traveling of the vehicle, a problem may be caused in using the function of projecting the images.

SUMMARY

The present disclosure has been made to solve the above-mentioned problems occurring in the prior art while advantages achieved by the prior art are maintained intact.

An aspect of the present disclosure provides a display apparatus of a vehicle, capable of outputting an image without image distortion even if vibration is made in a vehicle, a method for operating the same, and a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a display apparatus of a vehicle may include a first display device to display an image including first information and second information related to the vehicle, to a first display region, a second display device to display an image to a second display region, a first controller to control an operation of the first display device, based on acquired information on a behavior of the vehicle, and a second controller to control an operation of the second display device, based on the acquired information on the behavior of the vehicle.

According to an embodiment, the first information and the second information may include at least one of a forward direction of the vehicle, a speed of the vehicle, a traveling path of the vehicle, a speed limit of a road, a remaining distance to a destination, or information on an obstacle.

According to an embodiment, the first controller and the second controller may control the first display device and the second display device, respectively, to alternately display images.

According to an embodiment, the first controller may transmit a control signal to the second controller, such that the second display device is prevented from displaying the image.

According to an embodiment, the first controller may transmit a control signal to the second controller, such that the second display device displays the image, when the first display device is determined as failing to display the image.

According to an embodiment, the information on the behavior of the vehicle may include at least any one of information on the vibration of the vehicle or information on vibration of the vehicle which is expected.

According to an embodiment, the first controller and the second controller may control the first display device and the second display device, respectively, to simultaneously display the image, based on the information on the behavior of the vehicle.

According to an embodiment, the first controller may transmit a clock signal to the second controller, and the second controller may be synchronized to display the image, based on the clock signal.

According to an embodiment, the first controller may transmit a control signal to the second controller, such that the second display device is prevented from simultaneously displaying the image, when the vibration of the vehicle is present or when the vibration of the vehicle is expected.

According to another aspect of the present disclosure, a method for operating a display apparatus of a vehicle may include controlling the operation of the first display device to display an image including first information and second information related to the vehicle, to a first display region, based on the acquired information on the behavior of the vehicle, and controlling the operation of the second display device to display an image to a second display region, based on the acquired information on the behavior of the vehicle.

According to an embodiment, the first information and the second information may include at least one of a forward direction of the vehicle, a speed of the vehicle, a traveling path of the vehicle, a speed limit of a road, a remaining distance to a destination, or information on an obstacle.

According to an embodiment, the method may further include individually controlling the first display device and the second display device such that the first display device or the second display device alternately displays an image.

According to an embodiment, the method may further include transmitting a control signal such that the second display device is prevented from displaying an image.

According to an embodiment, the method may further include transmitting a control signal to the second controller, such that the second display device displays the image, when the first display device is determined as failing to display the image.

According to an embodiment, the information on the behavior of the vehicle may include at least any one of information on the vibration of the vehicle or information on vibration of the vehicle which is expected.

According to an embodiment, the method may further include individually controlling the first display device and the second display device to simultaneously display the images, based on the information on the behavior of the vehicle.

According to an embodiment, the method may further include transmitting the clock signal and synchronizing to display the image, based on the clock signal.

According to an embodiment, the method may further include transmitting a control signal, such that the second display device is prevented from simultaneously displaying the image, when the vibration of the vehicle is present or when the vibration of the vehicle is expected.

According to another aspect of the present disclosure, a vehicle may include a sensor to acquire information on a behavior of the vehicle, and a display apparatus including a display device to display an image including the first information and the second information related to the vehicle, and a controller to control an operation of the display device, based on the acquired information on the behavior of the vehicle. The display apparatus may be related to any one of a left head lamp or a right head lamp.

According to an embodiment, the display apparatus may be included in only one of the left head lamp or the right head lamp.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
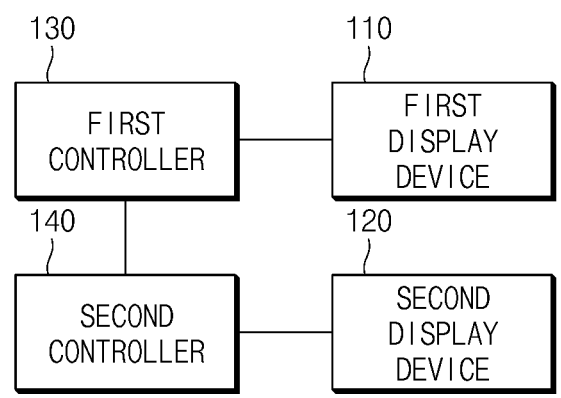
FIG. 1 is a block diagram illustrating a display apparatus of a vehicle, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first,' 'second,' and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a display apparatus of a vehicle, according to an embodiment of the present disclosure.

Referring to FIG. 1, according to an embodiment of the present disclosure, a display apparatus 100 of a vehicle may include a first display device 110, a second display device 120, a first controller 130, and a second controller 140.

The first display device 110 may display information related to the vehicle. For example, the first display device 110 may include at least any one of a higher resolution LED, an LED array, an LED matrix, or a digital mirror device (DMD).

The first display device 110 may display an image including information related to the vehicle, to a first display region. For example, the first display device 110 may display an image including the first information and the second information related to the vehicle. For another example, the first information and the second information may include at least any one of a forward direction of the vehicle, the speed of the vehicle, the traveling path of the vehicle, the speed limit of the road, a remaining distance to a destination, or information on an obstacle, but the present disclosure is not limited thereto.

According to an embodiment, the first display device 110 may include a lamp. For example, the first display device 110 may include a left lamp of the vehicle.

The second display device 120 may display information related to the vehicle. For example, the second display device 120 may include at least any one of a higher resolution LED, an LED array, a LED matrix, or a digital mirror device (DMD).

The second display device 120 may display an image including information related to the vehicle, to a second display region. For example, the second display device 120 may display an image including the first information and the second information related to the vehicle. For another example, the first information and the second information may include at least any one of a forward direction of the vehicle, the speed of the vehicle, the traveling path of the vehicle, the speed limit of the road, a remaining distance to a destination, or information on an obstacle, but the present disclosure is not limited thereto.

According to an embodiment, the second display device 120 may be included in a lamp. For example, the second display device 120 may include a left lamp of the vehicle.

According to an embodiment, the first display device 110 and the second display device 120 may simultaneously display the image. For example, the first display device 110 may display an image including the first information related to the vehicle, and the second display device 120 may display an image including the second information related to the vehicle.

According to another embodiment, only any one of the first display device 110 and the second display device 120 may display an image. For example, the first display device 110 may include an image including both the first information and the second information related to the vehicle, and the second display device 120 may not display an image. In this case, since only the first display device 110 displays the image, even when the vibration or the impact of the vehicle is made, the image may be displayed without image distortion.

The first controller 130 may acquire the information on the behavior of the vehicle (i.e., vehicle behavior information). For example, the information on the behavior of the vehicle may include at least any one of information on the vibration of the vehicle (i.e., vehicle vibration information) or information on the vibration of the vehicle, which is expected (i.e., vehicle vibration prediction information). For example, the information on the behavior of the vehicle may include at least any one of information on the collision of the vehicle, information on the impact on the vehicle, information on the collision of the vehicle, which is expected, or information on the impact of the vehicle, which is expected.

The first controller 130 may control the operation of the first display device 110, based on the acquired information on the behavior of the vehicle. For example, the first controller 130 may control whether to display an image through the first display device 110, and may control at least one of a direction, an angle, a position, a height, a range, a brightness, luminance, a color, a time, and information for displaying an image to be displayed through the first display device 110. For example, the information on the vibration of the vehicle, which is expected, may be acquired based on the traveling path of the vehicle, the position of the vehicle, or traffic information.

The second controller 140 may acquire the information on the behavior of the vehicle. For example, the information on the behavior of the vehicle may include at least any one of information on the vibration of the vehicle or information on the vibration of the vehicle, which is expected. For example, the information on the behavior of the vehicle may include at least any one of information on the collision of the vehicle, information on the impact on the vehicle, information on the collision of the vehicle, which is expected, or information on the impact of the vehicle, which is expected.

The second controller 140 may control the operation of the second display device 120, based on the acquired information on the behavior of the vehicle. For example, the second controller 140 may control whether to display an image through the second display device 120, and may control at least one of a direction, an angle, a position, a height, a range, a brightness, luminance, a color, a time, and information for displaying an image to be displayed through the second display device 120.

Figure 2:
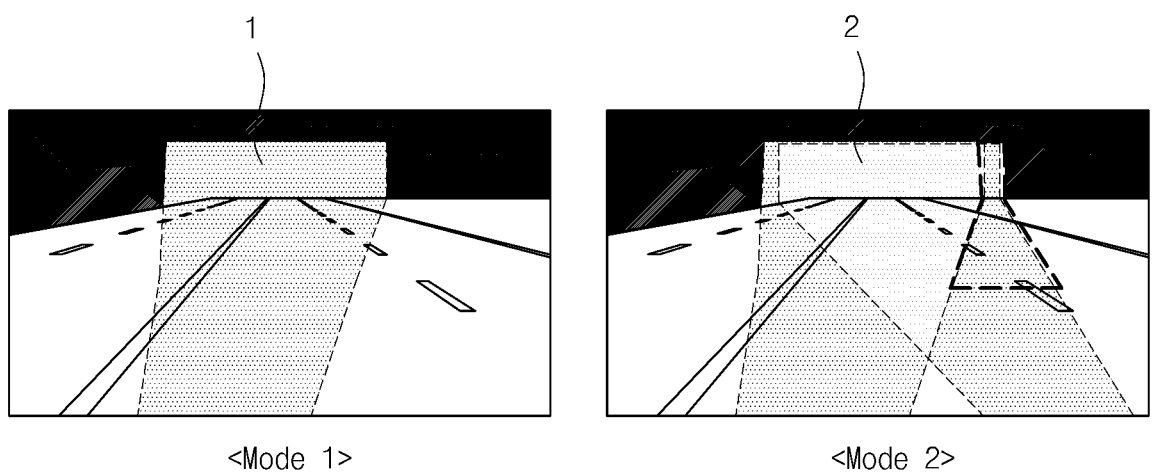
FIG. 2 is a view illustrating two modes of displaying an image by a display apparatus of a vehicle, according to an embodiment of the present disclosure.

FIG. 2 is a view illustrating two modes of displaying an image by a display apparatus of a vehicle, according to an embodiment of the present disclosure.

Referring to FIG. 2, according to an embodiment of the present disclosure, the display apparatus 100 of the vehicle may display an image in front of the vehicle, in two modes.

"Mode 1" is a mode to display an image through only the first display device 110 included in the display apparatus 100 of the vehicle.

"Mode 2" is a mode to display an image through both the first display device 110 and the second display device 120 included in the display apparatus 100 of the vehicle.

Referring to "Mode 1" and "Mode 2", there is not difference between a region 1 for displaying an image when only the first display device 110 displays an image, and a region 2 for displaying an image when both the first display device 110 and the second display device 120 display an image. In other words, even if only the first display device 110 displays the image, the image including information related to the vehicle may be displayed for the driver.

Although not illustrated in FIG. 2, "Mode 3", which is a mode to display an image through only the second display device 120, is possible. When the image is displayed in "Mode 3", an image including information related to the vehicle may be displayed for the driver, which is similar to the comparison result between "Mode 1" and "Mode 2". In other words, the display apparatus 100 of the vehicle may display an image through only any one of the first display device 110 or the second display 120. Even if the image is displayed through only one display device, there is no difference in effect, when compared to the case that the image is displayed through both the first display device 110 and the second display device 120.

Figure 3:
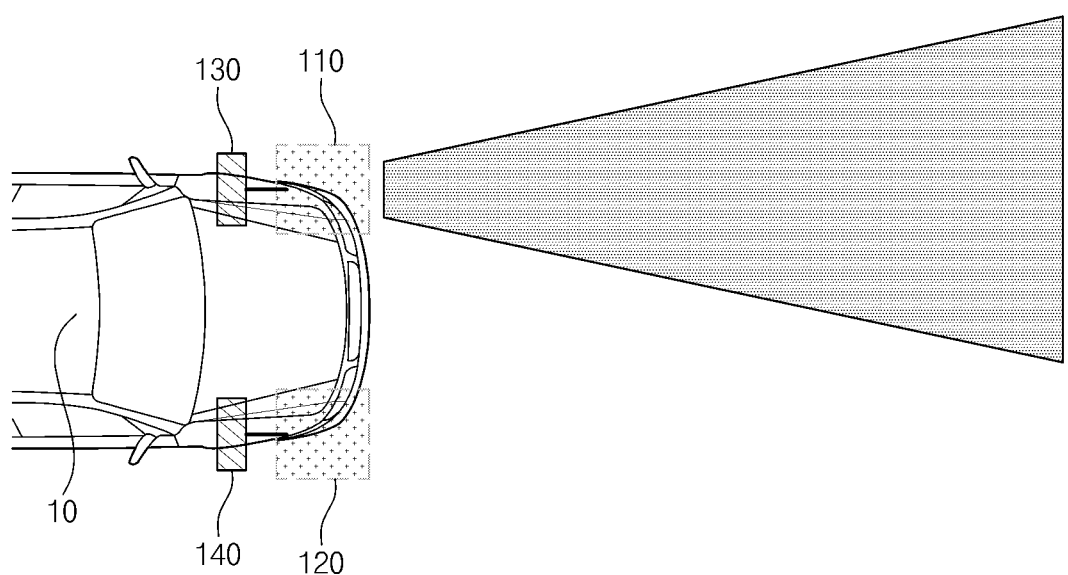
FIG. 3 is a view illustrating that one display device of a display apparatus of the vehicle displays an image, according to an embodiment of the present disclosure.

FIG. 3 is a view illustrating that one display device of a display apparatus of a vehicle displays an image, according to an embodiment of the present disclosure. Although FIG. 3 illustrates that the first display device 110 is positioned at the left side of the vehicle 10, and the second display device 120 is positioned at the right side of the vehicle 10, the present disclosure is not limited thereto.

Referring to FIG. 3, according to an embodiment of the present disclosure, the display apparatus 100 of the vehicle may display an image through one display device. For example, the first display device 110 may include an image, and the second display device 120 may not display an image.

The first controller 130 may control the first display device 110 to display an image. For example, the first controller 130 may control only the first display device 110 to display the image, by transmitting, to the second controller 140, a control signal for controlling the second display device 120 not to display the image. For another example, each of the first controller 130 and the second controller 140 may determine that only the first display device 110 displays an image, the first controller 130 may control the first display device 110 to display an image, and the second controller 140 may control the second display device 120 not to display the image.

According to an embodiment, the display apparatus 100 of the vehicle 10 may display an image through the second display device 120 and may not display the image through the first display device 110. In this case, the second controller 140 may control the second display device 120 to display the image, and the first controller 130 may control the first display device 110 not to display the image.

Figure 4:
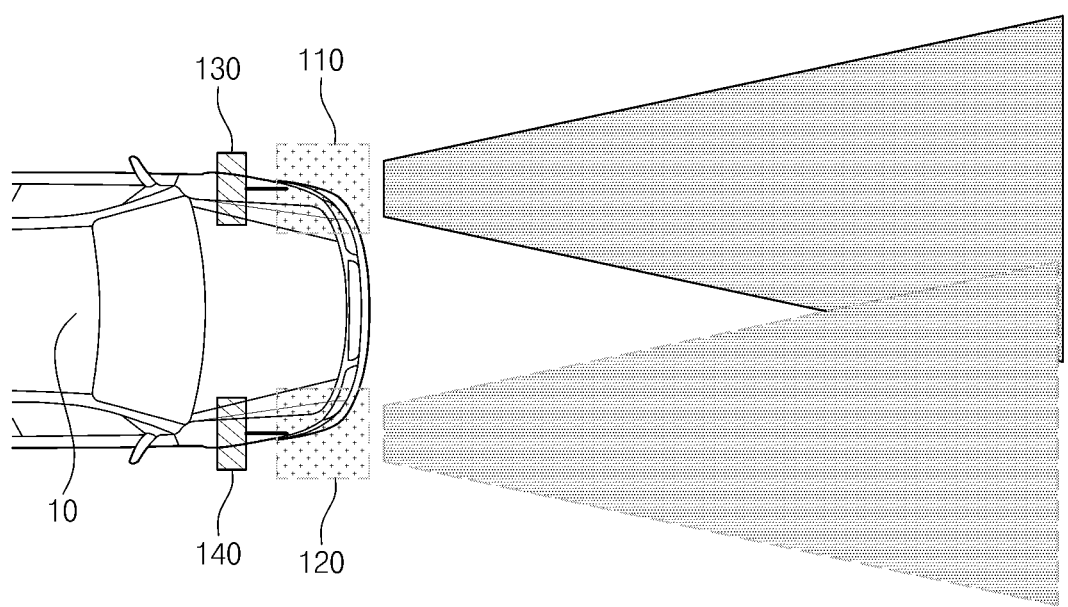
FIG. 4 is a view illustrating two modes of alternately displaying images by a display apparatus of a vehicle, according to an embodiment of the present disclosure.

FIG. 4 is a view illustrating two modes of alternately displaying images by a display apparatus of a vehicle, according to an embodiment of the present disclosure. Although FIG. 4 illustrates that the first display device 110 is positioned at the left side of the vehicle 10, and the second display device 120 is positioned at the right side of the vehicle 10, the present disclosure is not limited thereto.

The first controller 130 and the second controller 140 may control the first display device 110 and the second display device 120, respectively, to alternately display images For example, the alternately displaying of the image may refer to that the image is displayed through only any one of the first display device 110 or the second display device 120.

According to an embodiment, the first controller 130 may determine a display device, which displays an image, of the first display device 110 or the second display device 120. For example, the first controller 130 may determine a display device, which displays an image, of the first display device 110 or the second display device 120, based on information on the behavior of the vehicle. According to an embodiment, the first controller 130 may set the first display device 110 to display an image, and may set the second display device 120 no to display the image, in a default state. According to another embodiment, the second controller 140 may determine a display device, which displays an image, of the first display device 110 or the second display device 120.

The first controller 130 may transmit a control signal to the second controller 140, such that the second controller 140 is prevented from displaying an image, when the first display device 110 displays an image. For example, when receiving the control signal from the first controller 130, the second controller 140 may control the second display device 120 not to display an image.

The first controller 130 may transmit a control signal to the second display device 120, such that the second display device 120 displays an image, when determining that the first display device 110 fails to display an image. For example, when receiving the control signal from the first controller 130, the second controller 140 may control the second display device 120 to display the image.

According to an embodiment, the first controller 130 may determine that the first display device 110 fails to display an image, in at least one of the case that a vibration is expected with respect to the first display device 110, the case that an impact is expected with respect to the first display device 110, the case that a vibration is made with respect to the first display device 110, and the case that the vibration is expected with respect to the first display device 110 and an obstacle is present in front of the first display device 110. In this case, the first controller 130 may allow the second controller 140 to display an image through the second display device 120.

According to an embodiment, the first controller 130 may transmit a control signal to the second controller 140, such that the image is displayed through the second display device 120, when it is more effective that the image is displayed through the second display device, even though the displaying of the image through the first display device 110 is not failed. For example, when the vehicle 10 rotates in a direction in which the second display device 120 is disposed, the first controller 130 may determine that it is more effective that the second display device 120 displays an image, in any one of the case that the second display device 120 more smoothly displays the image than the first display device 110, or the case that a portion of the first display device 110 is failed.

According to an embodiment of the present disclosure, the display apparatus 100 of the vehicle 10 may control the first display device 110 or the second display device 120 to alternately display an image including information related to the vehicle, based on the information on the behavior, thereby providing, to the driver, an image which has no image distortion and is matched to a vehicle situation.

Figure 5:
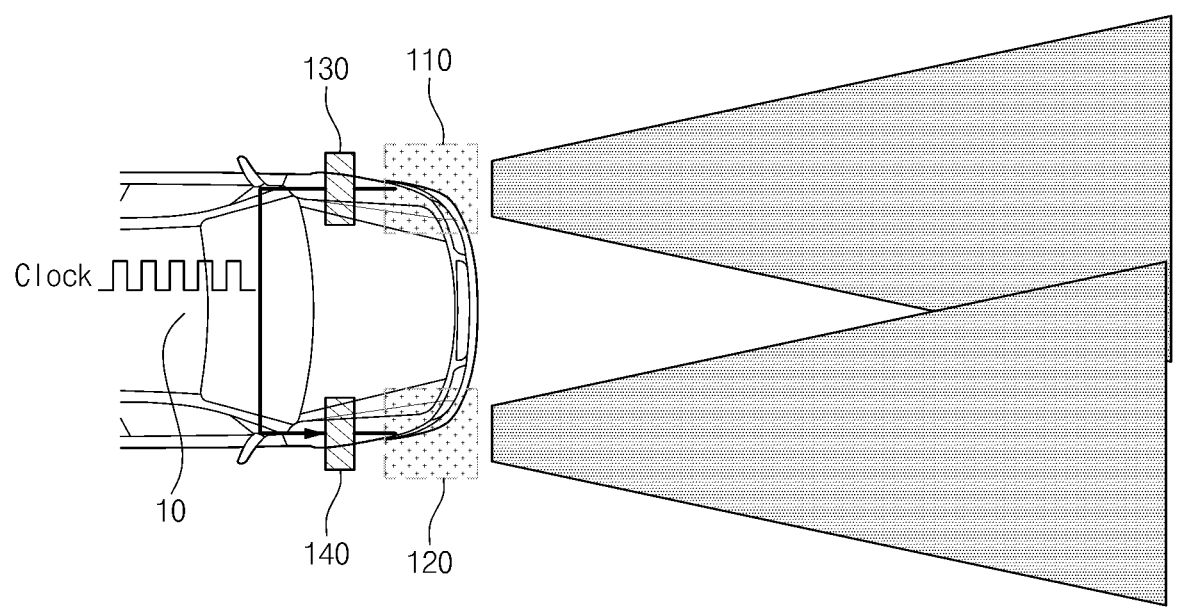
FIGS. 5 and 6 are views illustrating that a display apparatus of a vehicle simultaneously displays an image, according to an embodiment of the present disclosure.

FIG. 5 is a view illustrating that a display apparatus of a vehicle simultaneously displays images, according to an embodiment of the present disclosure.

Referring to FIG. 5, according to an embodiment of the present disclosure, the display apparatus 100 of the vehicle 10 may simultaneously display images through the first display device 110 and the second display device 120. For example, the first controller 130 and the second controller 140 may control the first display device 110 and the second display device 120 to simultaneously display the images, based on the information on the behavior of the vehicle 10.

When the images are simultaneously displayed, the display apparatus 100 of the vehicle 10 allows the first display device 110 and the second display device 120 to be synchronized with each other to display images, thereby reducing the image distortion. To this end, the first controller 130 may generate a clock signal, and may transmit the generated clock signal to the second controller 140. In this case, the first controller 130 may control the first display device 110 to display an image, based on the generated clock signal, and the second controller 140 may control the second display device 120 to display an image, based on the clock signal received from the first controller 130. In other words, the second controller 140 may be synchronized to display an image, based on the received clock signal. According to an embodiment, the second controller 140 may generate a clock signal, and may transmit the clock signal to the first controller 130 to be synchronized with the first controller 130 such that the image is displayed.

Figure 6:
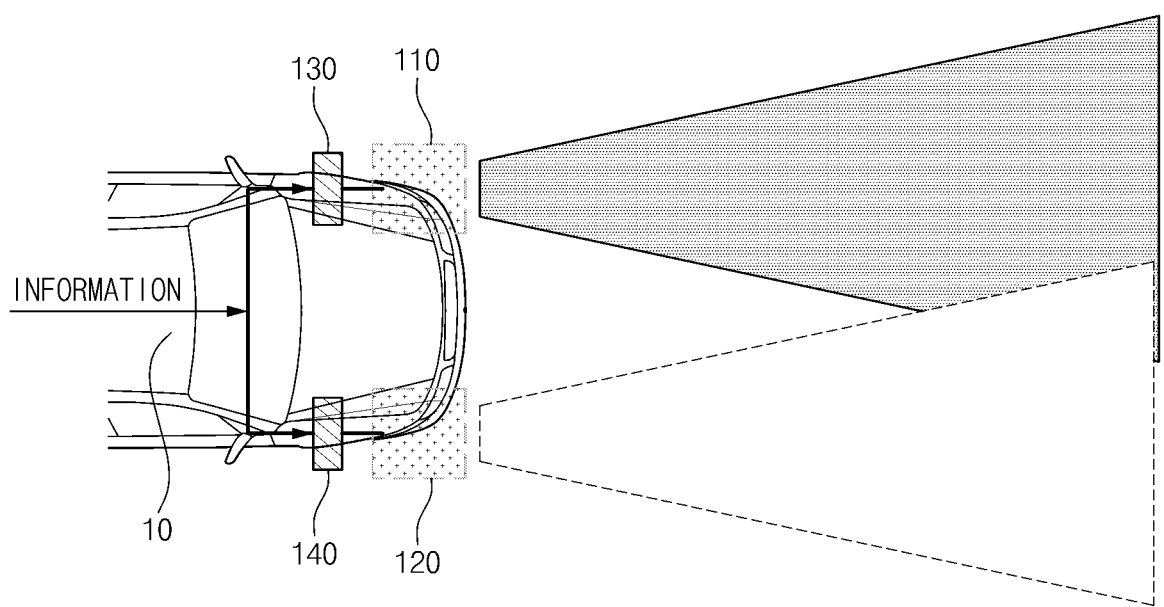

Referring to FIG. 6, the display apparatus 100 of the vehicle 10 may perform a control operation, such that one display device displays an image, when the images are simultaneously displayed, and when specific information is acquired. For example, the specific information may be the information on the behavior of the vehicle 10. The information on the behavior of the vehicle 10 may include at least any one of the information on the vibration of the vehicle 10, the information of the vibration of the vehicle 10, which is expected, information on the collision of the vehicle 10, information on the impact of the vehicle 10, and information on an impact of the vehicle 10, which is expected. The first controller 130 may transmit a control signal to the second controller 140, such that the second display device 120 is prevented from simultaneously displaying an image, when it is determined, based on the information on the behavior of the vehicle 10, the vibration of the vehicle 10 is present or is expected. For example, the second controller 140 may stop the second display device 120 displaying the image, when receiving the control signal. Accordingly, since the first display device 110 displays all images, the distortion of the displayed images may be reduced.

According to another embodiment, the first controller 130 and the second controller 140 may acquire information on the behavior of the vehicle 10. When the vibration of the vehicle 10 is present or expected, the first controller 130 may control the first display device 110 to display all images, and the second controller 140 may control the second display device 120 not to display any image.

Figure 7:
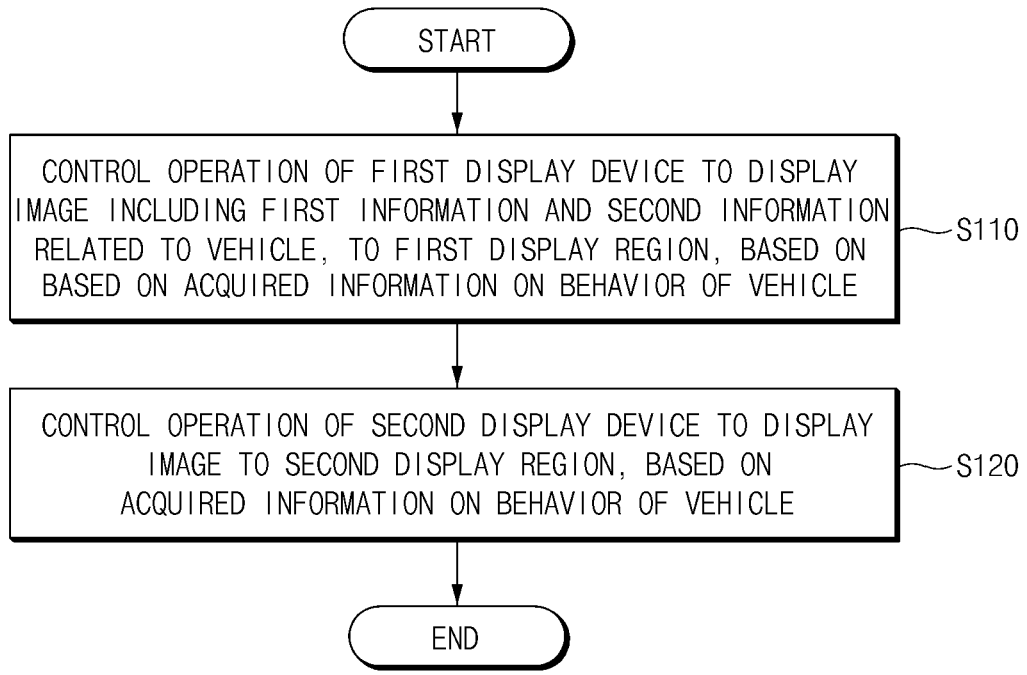
FIG. 7 is a flowchart illustrating a method for operating a display apparatus of a vehicle, according to an embodiment of the present disclosure.

FIG. 7 is a flowchart illustrating a method for operating a display apparatus of a vehicle, according to an embodiment of the present disclosure.

Referring to FIG. 7, according to an embodiment of the present disclosure, the method for operating the display apparatus 100 of the vehicle 10 may include controlling the operation of the first display device to display an image including first information and second information related to the vehicle, to a first display region, based on the acquired information on the behavior of the vehicle (S110), and controlling the operation of the second display device to display an image to a second display region, based on the acquired information on the behavior of the vehicle (S120).

In the controlling of the operation of the first display device to display the image including the first information and the second information related to the vehicle, to the first display region, based on the acquired information on the behavior of the vehicle (S110), the first controller 130 may control the operation of the first display device 110. For example, the first controller 130 may control the first display device 110 to display the image including the first information and the second information related to the vehicle, to the first display region. For another example, the first information and the second information related to the vehicle may include at least any one of a forward direction of the vehicle, the speed of the vehicle, the traveling path of the vehicle, the speed limit of the road, a remaining distance to a destination, or information on an obstacle.

In the controlling of the operation of the second display device to display the image to the second display region, based on the acquired information on the behavior of the vehicle (S120), the second controller 140 may control the operation of the second display device 120. For example, the second controller 140 may control the second display device 120 to display an image to the second display region.

Figure 8:
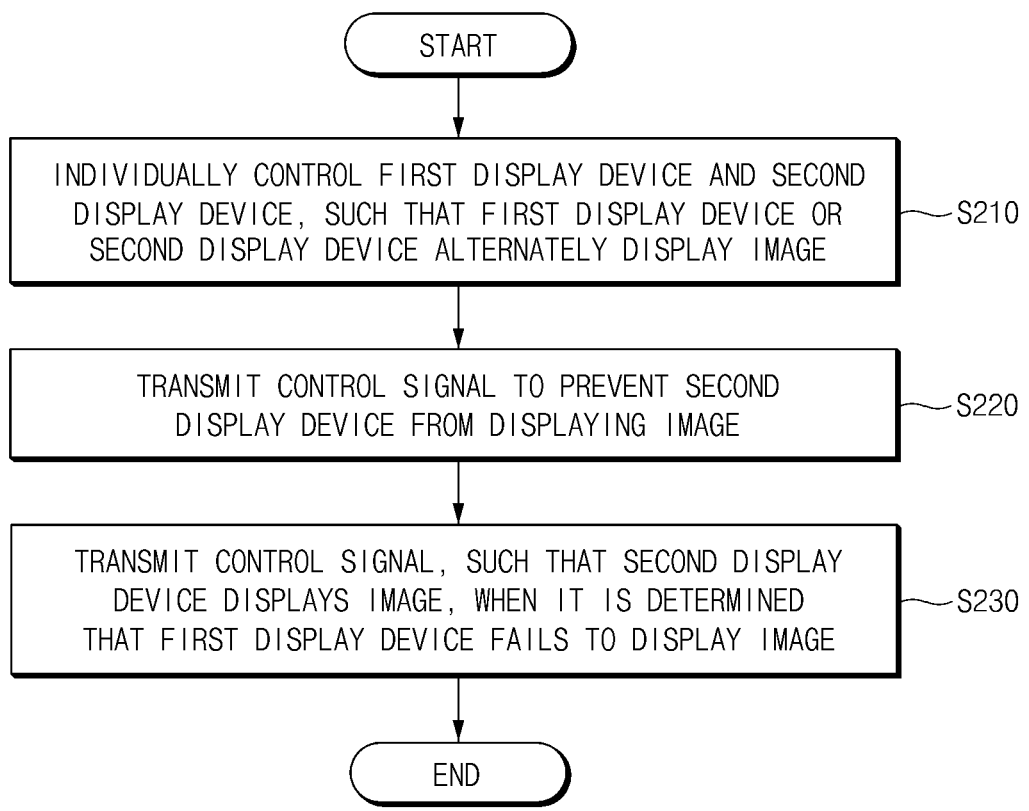
FIGS. 8 and 9 are flowcharts illustrating a method for operating a display apparatus of a vehicle, according to an embodiment of the present disclosure.
Figure 9:
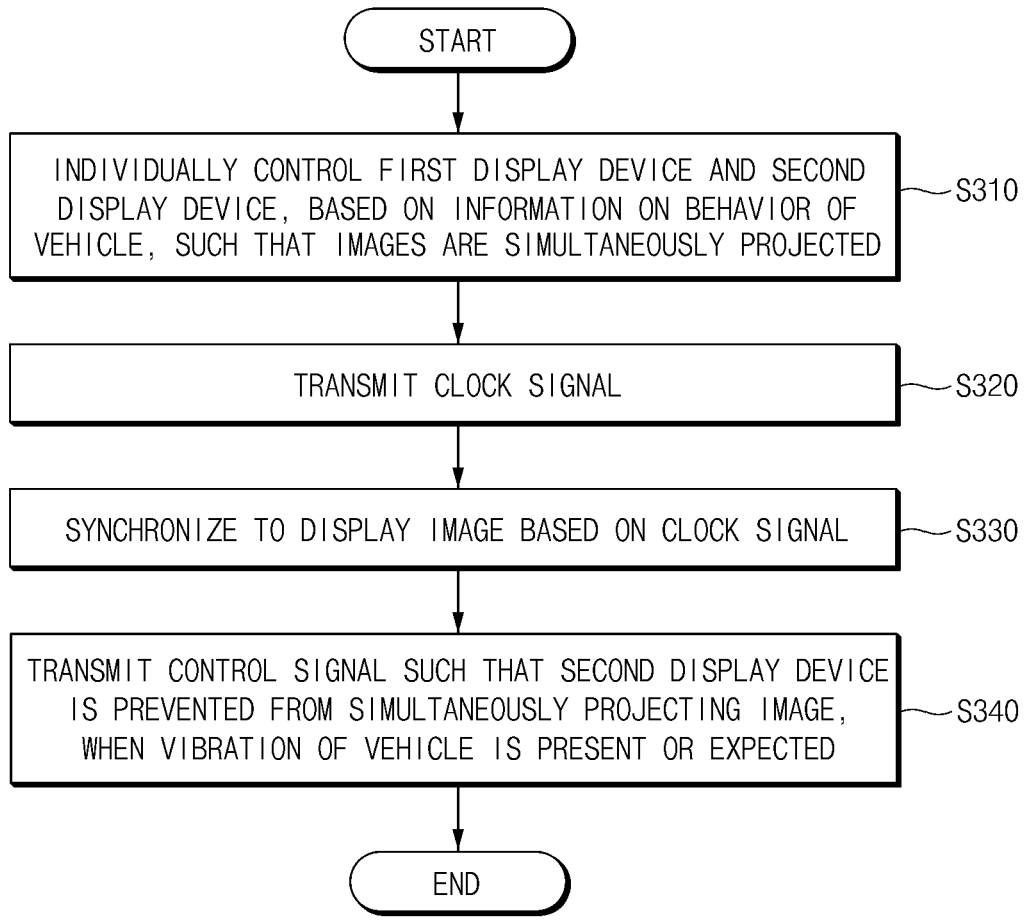

FIGS. 8 and 9 are flowcharts illustrating a method for operating a display apparatus of a vehicle in detail, according to an embodiment of the present disclosure.

Referring to FIG. 8, according to an embodiment of the present disclosure, the method for operating the display apparatus 100 of the vehicle includes individually controlling a first display device and a second display device, such that the first display device and the second display device alternately display the image (S210), transmitting a control signal to prevent the second display device from displaying the image (S220), and transmitting the control signal, such that the second display device displays an image, when it is determined that the first display device fails to display an image (S230). According to an embodiment, S210 to S230 may be included in any one of S110 to S120 of FIG. 7.

In the individually controlling of the first display device and the second display device, such that the first display device or the second display device alternately display the image (S210), the first controller 130 and the second controller 140 may control the first display device 110 and the second display device 120, respectively, such that the first display device 110 and the second display device 120 alternately display an image. For example, when the first controller 130 controls the first display device 110 to display an image, the second controller 140 may control the second display device 120 not to display an image. When the first controller 130 controls the first controller 130 not to display an image, the second controller 140 may control the second display device 120 to display an image. In other words, the first controller 130 and the second controller 140 may perform control operations such that only one of the first display device 110 and the second display device 120 displays an image.

In the transmitting of the control signal to prevent the second display device from displaying the image (S220), when the first controller 130 controls the first display device 110 to display an image, the first controller 130 may transmit the control signal to the second controller 140, such that the second display device 120 is prevented from displaying the image. For example, the second controller 140 may control the second display device 120, based on the control signal received from the first controller 130, such that the second display device 120 is prevented from displaying an image. According to an embodiment, when S230 is performed, S220 may not be performed. According to another embodiment, when the first display device 110 and the second display device 120 simultaneously display an image, S220 may not be performed.

In the transmitting of the control signal, such that the second display device displays an image, when it is determined that the first display device fails to display an image (S230), the first controller 130 may transmit the control signal to the second controller 140, such that the second display device 120 displays an image. For example, the second controller 140 may control the second display device 120 to display an image, based on the control signal received from the first controller 130. According to an embodiment, when S220 is performed, S230 may not be performed. According to another embodiment, when the first display device 110 and the second display device 120 simultaneously display an image, S230 may not be performed.

Referring to FIG. 9, according to an embodiment of the present disclosure, the method for operating the display apparatus 100 of the vehicle may further include individually controlling a first display device and a second display device, based on the information on the behavior of the vehicle, such that images are simultaneously projected (S310), transmitting a clock signal (S320), synchronizing to display an image based on the clock signal (S330), and transmitting a control signal such that the second display device is prevented from simultaneously projecting the image, when the vibration of the vehicle is present or expected (S340) According to an embodiment, S310 to S340 may be included in at least any one of S110 to S120 of FIG. 7.

The first controller 130 and the second controller 140 may control the first display device 110 and the second display device 120 to simultaneously project the images, based on the information on the behavior of the vehicle 10, in individually controlling the first display device and the second display device, based on the information on the behavior of the vehicle, such that images are simultaneously projected (S310). The information on the behavior of the vehicle 10 may include at least any one of the information on the vibration of the vehicle 10, the information on the vibration of the vehicle 10, which is expected, information on the collision of the vehicle 10, information on the impact of the vehicle 10, information on the collision of the vehicle, which is expected, and information on the impact of the vehicle 10, which is expected.

The first controller 130 may generate a clock signal, and may transmit the generated clock signal to the second controller 140, in the transmitting of the clock signal (S320).

The second controller 140 may be synchronized to display an image, based on the received clock signal, in the synchronizing to display an image based on the clock signal (S330), For example, the first controller 130 may control the first display device 110 to display an image, based on the generated clock signal, and the second controller 140 may control the second display device 120 to display an image, based on the received clock signal, such that the first display device 110 and the second display device 120 are synchronized with each other to simultaneously display images.

The first controller 130 may transmit a control signal to the second controller 140, such that the second display device 120 is prevented from simultaneously projecting an image, when it is determined, based on the information on the behavior of the vehicle 10, that the vibration of the vehicle is present or expected, in the transmitting of the control signal such that the second display device is prevented from simultaneously projecting the image, when the vibration of the vehicle is present or expected (S340). For example, the second controller 140 may control the second display device 120, such that the second display device 120 is prevented from displaying an image, based on the received control signal, and the first display device 110 may display all images.

Figure 10:
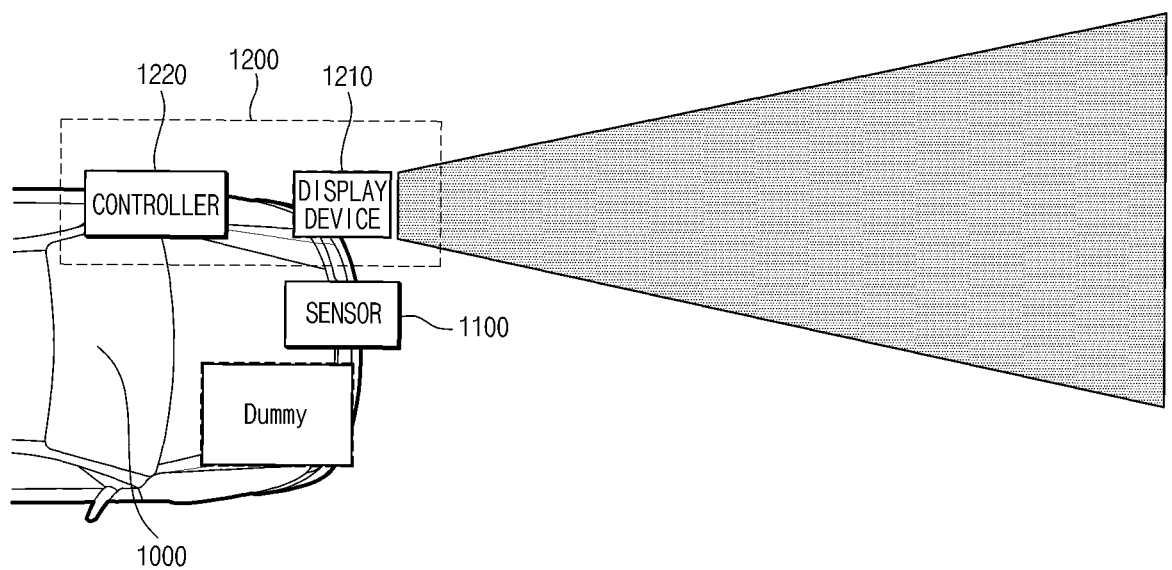
FIG. 10 is a view illustrating a vehicle, according to an embodiment of the present disclosure.

FIG. 10 is a view illustrating a vehicle, according to an embodiment of the present disclosure.

Referring to FIG. 10, according to an embodiment of the present disclosure, a vehicle 1000 may include a sensor 1100 and a display apparatus 1200.

The sensor 1100 may sense information on the vehicle 1000. For example, the sensor 1100 may acquire the information on the behavior of the vehicle. For another example, the sensor 1100 may sense at least any one of the information on the vibration of the vehicle 1000, the information of a vibration of the vehicle 1000, which is expected, information on the collision of the vehicle 1000, information on the impact of the vehicle 10, information on collision of the vehicle, which is expected, and information on an impact of the vehicle 1000, which is expected. According to an embodiment, the sensor 1100 may include at least any one of an acceleration sensor, a Lidar sensor, a camera sensor, and a radar sensor. The sensor 1100 may transmit the sensed information to the display apparatus 1200.

The display apparatus 1200 may include a display device 1210 and a controller 1220. The display apparatus 1200 may display an image in front of the vehicle 1000. For example, the display apparatus 1200 may be related to any one of a left head lamp or a right head lamp of the vehicle 1000. For another example, the display apparatus 1200 may be included in the head lamp of the vehicle 1000.

According to an embodiment, the display apparatus 1200 may be included in only any one of head lamps of the vehicle 1000. In other words, the display apparatus 1200 may not be included in a head lamp different from the head lamp including the display apparatus 1200. For example, the display apparatus 1200 may be included in the left head lamp of the vehicle 1000 and may not be included in the right head lamp of the vehicle 1000. Although FIG. 10 illustrates that the display apparatus 1200 may be included in the left head lamp of the vehicle 1000, the present disclosure is not limited thereto. For example, the display apparatus 1200 may be included in the right head lamp of the vehicle 1000. In this case, the display apparatus 1200 may not be included in the left head lamp.

For example, the display device 1210 may display an image including the first information and the second information related to the vehicle. For another example, the first information and the second information related to the vehicle may include at least any one of a forward direction of the vehicle, the speed of the vehicle, the traveling path of the vehicle, the speed limit of the road, a remaining distance to a destination, or information on an obstacle.

The controller 1220 may control the operation of the display device 1210. For example, the controller 1220 may control the display device 1210 to display an image, based on the information on a behavior of the vehicle.

According to an embodiment, in the vehicle 1000, the display apparatus 1200 may not be mounted in a head lamp other than the head lamp including the display apparatus 1200, and may process, as a dummy, the head lamp having the display apparatus 1200. In this case, when processing the head lamp having the display apparatus 1200 as the dummy, the manufacturing costs of the vehicle 1000 may be reduced.

According to an embodiment of the present disclosure, in the display apparatus of the vehicle, as the display is controlled based on behavior information of the vehicle, even when vibration and/or impact is made in the vehicle, the image may be output without image distortion.

According to an embodiment of the present disclosure, the display apparatus of the vehicle may perform a control operation such that images are alternately displayed through opposite display devices. Accordingly, the images may be effectively displayed depending on driving situation of the vehicle.

According to an embodiment of the present disclosure, the display apparatus of the vehicle may perform synchronization to display the images, based on a clock signal, when images are simultaneously displayed through opposite display devices and may perform a control operation to display an image through one display device when the vibration of the vehicle is made. Accordingly, the image may be displayed without distortion.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A display apparatus for a vehicle, comprising:
   a first display device configured to project, onto a first display region outside the vehicle, an image;
   a second display device configured to project the image onto a second display region outside the vehicle;
   a controller configured to control the first and second display devices based on vehicle behavior information, the vehicle behavior information including vehicle vibration information indicating whether the vehicle is experiencing or expected to experience vibration,
   wherein the controller is configured to control the second controller not to project the second image when the vehicle vibration information indicates that the vehicle is experiencing or expected to experience vibration.

2. The display apparatus of claim 1, wherein the vehicle information further includes at least one of a forward direction of the vehicle, a speed of the vehicle, a traveling path of the vehicle, a speed limit of a road, a remaining distance to a destination, and obstacle information.

3. The display apparatus of claim 1, wherein the controller is configured to control the first and second display devices to project the image alternately when the vehicle vibration information does not indicate that the vehicle is experiencing or expected to experience vibration.

4. The display apparatus of claim 1, wherein:
   the controller comprises first and second controllers configured to respectively control the first and second display devices, and
   the first controller is further configured to control the second controller to control the second display device to project the image when the first display device fails to project the image.

5. The display apparatus of claim 1, wherein the controller comprises first and second controllers configured to respectively control the first and second display devices to simultaneously project the image when the vehicle vibration information does not indicate that the vehicle is experiencing or expected to experience vibration.

6. The display apparatus of claim 1, wherein:
   the controller comprises first and second controllers configured to respectively control the first and second display devices, the first controller is further configured to transmit a clock signal to the second controller, and the second controller is configured to be synchronized with the first controller based on the clock signal.

7. A method for operating first and second display devices of a vehicle, the method comprising:

controlling the first and second display devices to project an image respectively on first and second display regions outside the vehicle;

while the first and second display devices are projecting the image respectively on the first and second display regions, receiving vehicle behavior information including vehicle vibration information indicating that the vehicle is experiencing or expected to experience vibration; and in response to the vehicle vibration information, controlling the second display device not to project the image.

8. The method of claim 7, wherein the vehicle information further includes at least one of a forward direction of the vehicle, a speed of the vehicle, a traveling path of the vehicle, a speed limit of a road, a remaining distance to a destination, and obstacle information.

9. The method of claim 7, wherein controlling the first and second display devices to project the image comprises controlling the first and second display devices to project the image alternately.

10. The method of claim 7, wherein controlling the first and second display devices to project the image comprises synchronizing a clock signal for operating the first and second display devices.

11. A vehicle comprising:

a plurality of head lamps;

a sensor configured to acquire vehicle behavior information;

a first display device configured to project an image onto a first display region outside the vehicle;

a second display device configured to project the image onto a second display region outside the vehicle; and a controller configured to control the first and second display devices based on vehicle behavior information, the vehicle behavior information including vehicle vibration information indicating whether the vehicle is experiencing or expected to experience vibration, wherein the controller is configured to control the second controller not to project the second image when the vehicle vibration information indicates that the vehicle is experiencing or expected to experience vibration.

* * * * *